United States Patent [19]

Shibata et al.

[11] Patent Number: 5,455,013

[45] Date of Patent: Oct. 3, 1995

[54] CARBON DIOXIDE ABSORBER AND ITS MANUFACTURING METHOD USING SLUDGE, AND METHOD FOR ABSORBING CARBON DIOXIDE IN EXHAUST GAS

[75] Inventors: Hitoshi Shibata; Manabu Satokawa; Young-Il Im; Kang-Haeng Lim, all of Shiga, Japan

[73] Assignee: Kyouei Bussan K.K., Shiga, Japan

[21] Appl. No.: 188,303

[22] Filed: Jan. 28, 1994

[30] Foreign Application Priority Data

Feb. 4, 1993 [JP] Japan ................... 5-017275

[51] Int. Cl.$^6$ .................................. C01F 11/18
[52] U.S. Cl. ................... 423/230; 34/79; 34/329; 95/139; 423/432; 106/900; 106/793; 405/263
[58] Field of Search .................. 34/79, 80, 329; 95/139; 423/230, 432; 106/793, 900; 405/263

[56] References Cited

U.S. PATENT DOCUMENTS

| | | | |
|---|---|---|---|
| 4,433,981 | 2/1984 | Slaugh et al. | 95/139 |
| 4,775,396 | 10/1988 | Rastelli et al. | 95/139 |
| 4,810,266 | 3/1989 | Zinnen et al. | 95/139 |
| 4,822,383 | 4/1989 | Brose et al. | 95/139 |
| 5,030,610 | 7/1991 | Sakata et al. | 95/139 |
| 5,061,455 | 10/1991 | Brose et al. | 95/139 |
| 5,250,196 | 10/1993 | Bosch | 210/195.1 |
| 5,298,475 | 3/1994 | Shibata et al. | 95/139 |

FOREIGN PATENT DOCUMENTS

| | | | |
|---|---|---|---|
| 1911373 | 11/1970 | Germany | 95/139 |
| 520999 | 7/1976 | U.S.S.R. | 95/139 |

*Primary Examiner*—Neil McCarthy
*Attorney, Agent, or Firm*—C. J. Fildes & Co.

[57] ABSTRACT

A carbon dioxide absorber is made by separating sludge from exhaust water discharged upon manufacturing fresh mixed concrete or concrete secondary products, then dewatering the separated sludge, and drying and crushing the dewatered sludge into dry fine particles.

8 Claims, 3 Drawing Sheets

CARBON DIOXIDE ABSORBER AND ITS MANUFACTURING METHOD USING SLUDGE, AND METHOD FOR ABSORBING CARBON DIOXIDE IN EXHAUST GAS

BACKGROUND OF THE INVENTION

1. Field of the Invention

This invention relates to a carbon dioxide absorber and its manufacturing method using sludge which is discharged typically as a result of manufacturing fresh mixed concrete or concrete secondary products, and also relates to a method for absorbing carbon dioxide contained in exhaust gas by using sludge.

2. Description of the Prior Art

The cement- or concrete-related industries discharge exhaust water including sludge, as result of manufacturing fresh mixed concrete or concrete secondary products, or washing concrete mixers, hoppers, agitator trucks or wet dust collectors. Such sludge-containing exhaust water includes 60 percent of cement particles of a mean grain size of 10 μm or less and their hydrate, such as particles of calcium hydroxide ($Ca(OH)_2$), and exhibits a strong alkali.

Heretofore, sludge-containing exhaust water has been treated by separating it into solid components and water by using a precipitator, a filter press or other appropriate equipment, so as to dispose the solid components as a waste and to reuse or release the water after pH adjustment using sulfuric acid ($H_2SO_4$), hydrochloric acid (HCl), carbon dioxide ($CO_2$), or the like.

A conventional system for treatment of such exhaust water is outlined below with reference to FIG. 3 which has been taken from "Simple Knowledge on Cement and Concrete" (by Junji Yamada et al., Kajima Shuppankai, Feb. 10, 1983, p. 256). FIG. 3 shows a treatment process of such exhaust water. Sludge-containing water discharged after cleaning of a plant such as mixers, hoppers, etc. (1) and that discharged after cleaning agitator trucks (2) are treated by a solid separating process. Solid components, such as ballast and sand, separated from the sludge-containing water are held as reusable materials, and the remainder water is sent to a subsequent treatment step, that is, a precipitating/separating step (6). Also, exhaust water from wet dust collectors (4) and that used for watering factory facilities and aggregates (5) are collected, and sent to the precipitating/separating step (6). Supernatant water, obtained in the precipitating/separating step (6) and not containing sludge and other solid components, is pH-adjusted in a neutralizing step (7), and released thereafter. Another part of the exhaust water obtained in the precipitating/separating step (6) and including solid components and a certain amount of water is adjusted in concentration to be reused for making concrete. The other part of the exhaust water obtained in the precipitating/separating step (6) and consisting of sludge is dewatered to be disposed as a final waste.

Existing treatment systems, as referred to above, certainly envisage the reuse of recovered sludge-containing, concentration-adjusted water for manufacturing concrete; however, they have no significant consideration on effective use of sludge itself.

In addition, existing treatment systems have no significant countermeasure on carbon dioxide contained in exhaust gas produced in cement manufacturing plants, thermal power plants and iron mills which produce a large amount of heat and gas.

OBJECT OF THE INVENTION

It is therefore an object of the invention to provide carbon dioxide absorber by using sludge produced upon manufacturing fresh mixed concrete and concrete secondary products, to thereby reduce the amount of wastes and to ultimately prevent global warming caused by the greenhouse effect attendant on an increase in carbon dioxide.

SUMMARY OF THE INVENTION

It is known that sludge discharged upon manufacturing fresh mixed concrete, etc. includes calcium hydroxide ($Ca(OH)_2$) and that calcium hydroxide gradually changes to calcium carbonate ($CaCO_3$) and loses its alkali by an reaction of carbon dioxide in the air.

The present invention utilizes such behaviors of calcium hydroxide contained in sludge.

In order to attain the object, a first invention provides a carbon dioxide absorber made of minute particles of calcium hydroxide obtained by dewatering and drying sludge discharged upon manufacturing fresh mixed concrete or concrete secondary products.

A second invention provides a method for fabricating a carbon dioxide absorber by drying and micronizing sludge discharged upon manufacturing fresh mixed concrete or concrete secondary products.

DETAILED DESCRIPTION OF THE PREFERRED EMBODIMENTS

Figure 1:
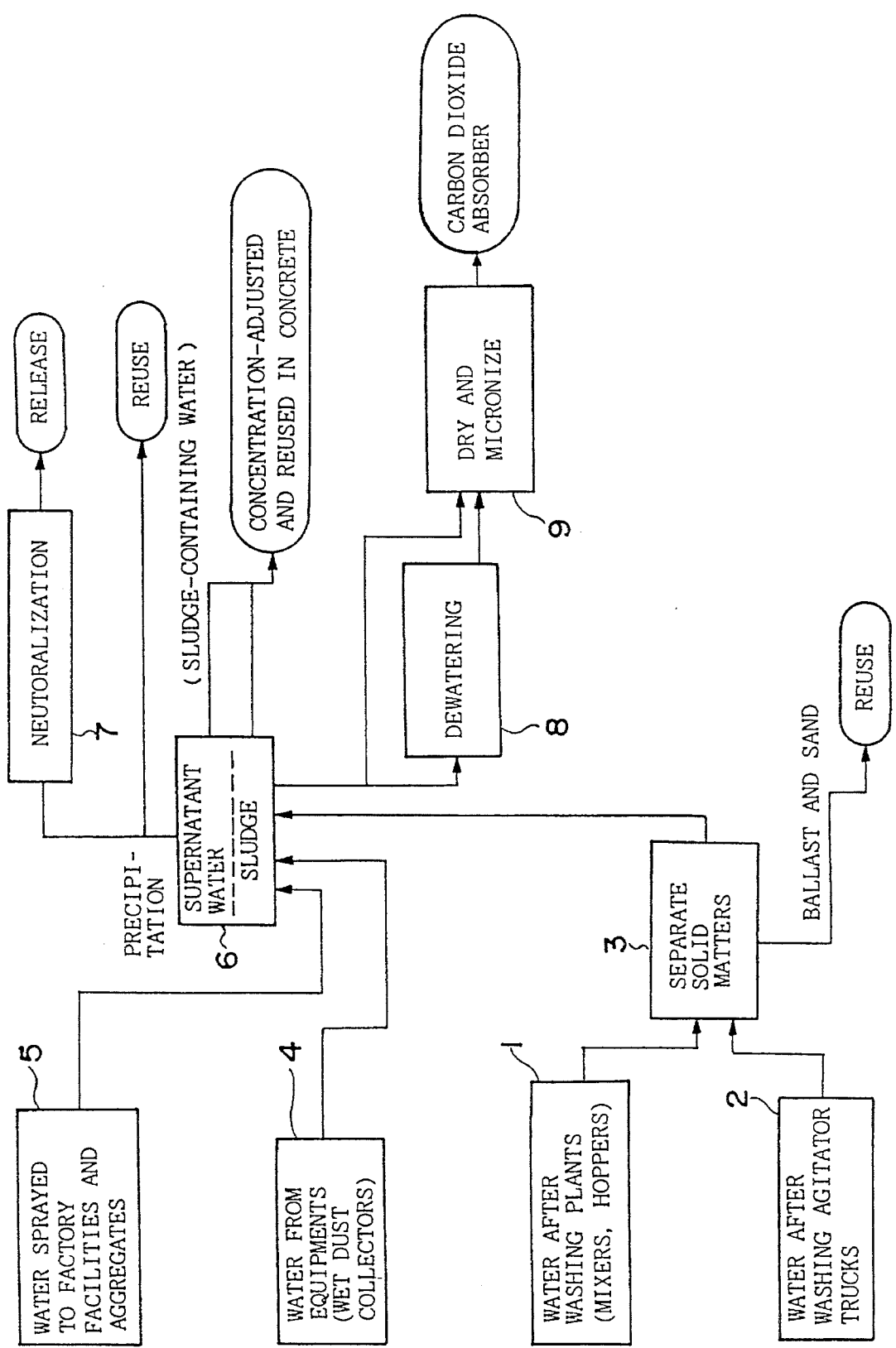
FIG. 1 is a flow chart of a manufacturing process of a carbon dioxide absorber according to the invention.

The invention is explained below with reference to FIG. 1 which shows a process according to the invention.

Exhaust water used by and discharged after washing mixers, hoppers and other plants (1) and washing agitator trucks (2) contains, typically, ballast, sand and other solids in addition to sludge. Such exhaust water (1) and (2) is sent to a solid separating step (3) for separating ballast, sand and other solid matters from the exhaust water. The recovered water through the step (3) is sent to a subsequent precipitating/separating step (6).

On the other hand, water discharged and recovered from wet dust collectors and other similar equipments or machines (4) and water used for watering facilities in the fresh mixed concrete factory or aggregates (5) are sent directly to the precipitating/separating step (6).

The precipitating/separating step (6) separates the recovered water into supernatant water in the uppermost layer, sludge-containing water in the intermediate layer, and sludge in the lowest layer. The supernatant water is released or reused directly or through a neutralizing step (7). The sludge-containing water is reused, typically, for making concrete after adjusting its concentration. The sludge in the lowest layer is sent to a dewatering step (8) using a filter press, or the like. The dewatering step (8) removes moisture from the sludge and makes it into a pancake-shaped sludge block. Thereafter, the dewatered, pancake-shaped sludge block is sent to a drying step (9) using an electric furnace or a heat exchanging furnace utilizing exhaust gas or exhaust heat. The drying step (9) crushes the sludge block into minute particles which are used as a carbon dioxide absorber.

The steps referred to above may be either continuous or in a batch manner.

The carbon dioxide absorber obtained by the method according to the invention is supposed to have the following composition:

| | |
|---|---|
| calcium oxide (CaO) | about 60% |
| silicon dioxide (SiO$_2$) | 25% |
| alumina (Al$_2$O$_3$) | 5% |
| iron oxide (Fe$_2$O$_3$) | 5% |
| sulfur oxide (SO$_3$) | 5% |
| potassium oxide (K$_2$O) | 1~5% |
| titanium oxide (TiO$_2$) | 1~5% |
| the others (Sr, Mg, Zn, Cu, Ni components, etc.) | around 0.1% |

An X-ray diffraction pattern of the carbon dioxide absorber (dried sludge) was compared with X-ray diffraction patterns of standard compositions obtained by retrieval, and it was revealed that major components of the carbon dioxide absorber are calcium hydroxide (Ca(OH)$_2$) and silicon dioxide (SiO$_2$).

More specifically, the carbon oxide absorber obtained by drying sludge discharged upon manufacturing fresh mixed concrete contains about 50% of calcium hydroxide, and it absorbs carbon dioxide.

It is also known that the moisture content of sludge just after being dewatered by the filter press is about 95%, and water occupies a large part of the sludge cake.

According to the reaction formula

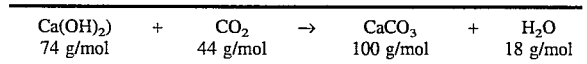

1 kg of the carbon dioxide absorber would contain 0.5 kg of calcium hydroxide (Ca(OH)$_2$) which corresponds to 6.75 mol. Therefore, according to the above reaction formula, 1 mol of calcium hydroxide (Ca(OH)$_2$) absorbs 1 mol of carbon dioxide (CO$_2$), and 1 kg of the carbon dioxide absorber absorbs 0.297 kg of carbon dioxide.

An assumed annual amount of sludge discharged from manufacturers of fresh mixed concrete in Okinawa Prefecture of Japan is about 18000 tons. Since Okinawa shares about 1.7% of the total manufacturing amount of fresh mixed concrete throughout Japan, the amount of sludge produced throughout Japan would be 1,050,000 tons. Considering that a half the value would be water, solid components in the sludge would amount to 525,000 tons, and 525,000 tons of the carbon dioxide absorber can be produced annually.

In other words, 525,000 tons of the carbon dioxide absorber can absorb 155,000 tons of carbon dioxide.

Explained below is a second embodiment of the invention with reference to FIG. 2.

The foregoing invention explained with reference to FIG. 1 is a method for manufacturing the carbon dioxide absorber by separating and dewatering solid components in sludge and by drying it thereafter. The second invention, however, is an alternative method which executes drying of sludge and absorption of carbon dioxide by the sludge by bringing separated and dewatered sludge into contact with carbon dioxide in an atmosphere such as exhaust gas of a cement factory which contains carbon dioxide.

Systems such as cement factories, thermal power plants, iron mills, etc., which use a large amount of heat, discharge hot exhaust gas containing carbon dioxide. The invention is a method which introduces such exhaust gas onto sludge just after separated from exhaust water or onto cake-shaped sludge obtained by dewatering the sludge, thereby to absorb carbon dioxide in the exhaust gas and to be simultaneously dried by the heat of the exhaust gas.

Figure 2:
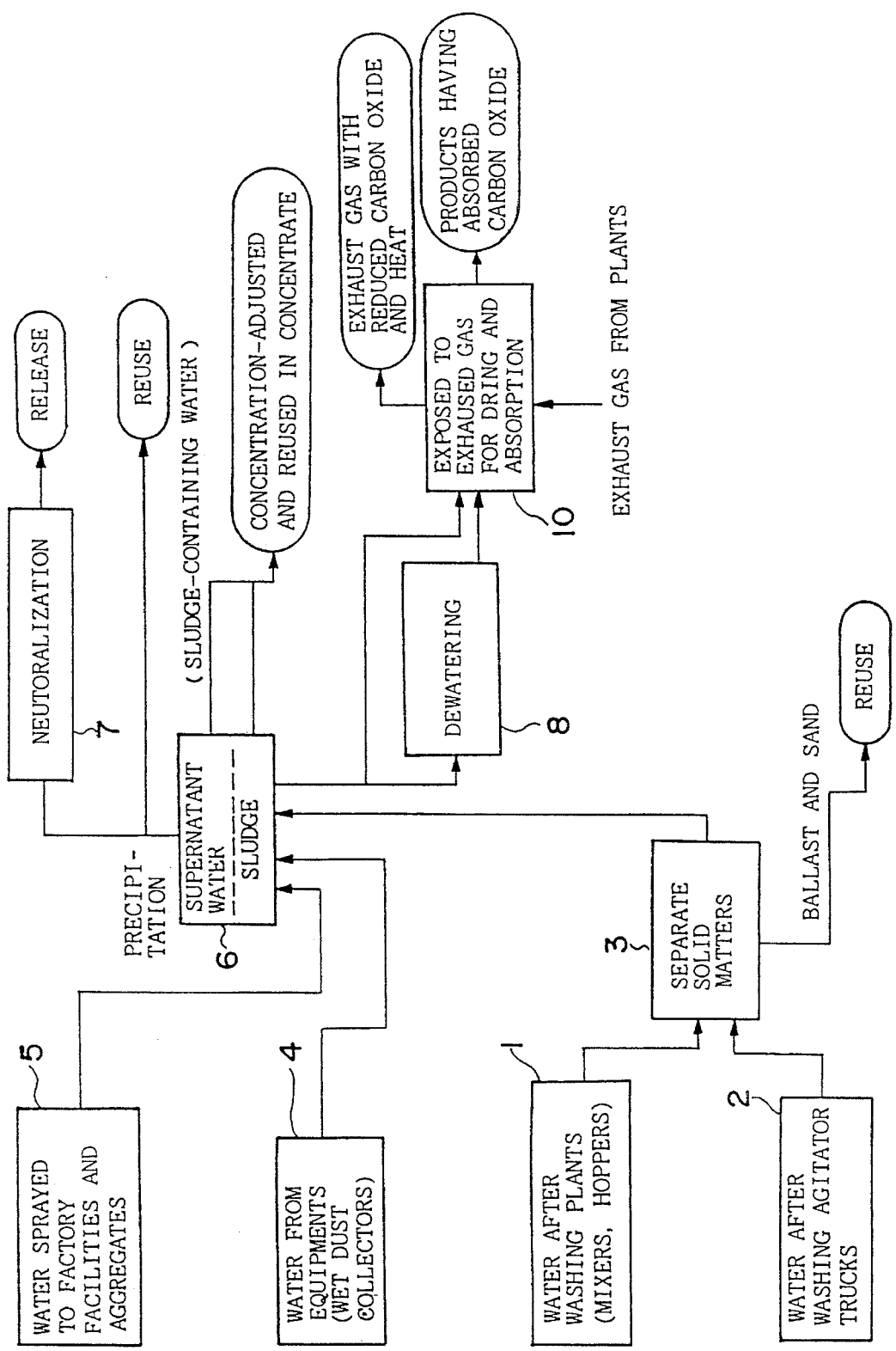
FIG. 2 is a flow chart of a carbon dioxide absorbing method according to the invention.
Figure 3:
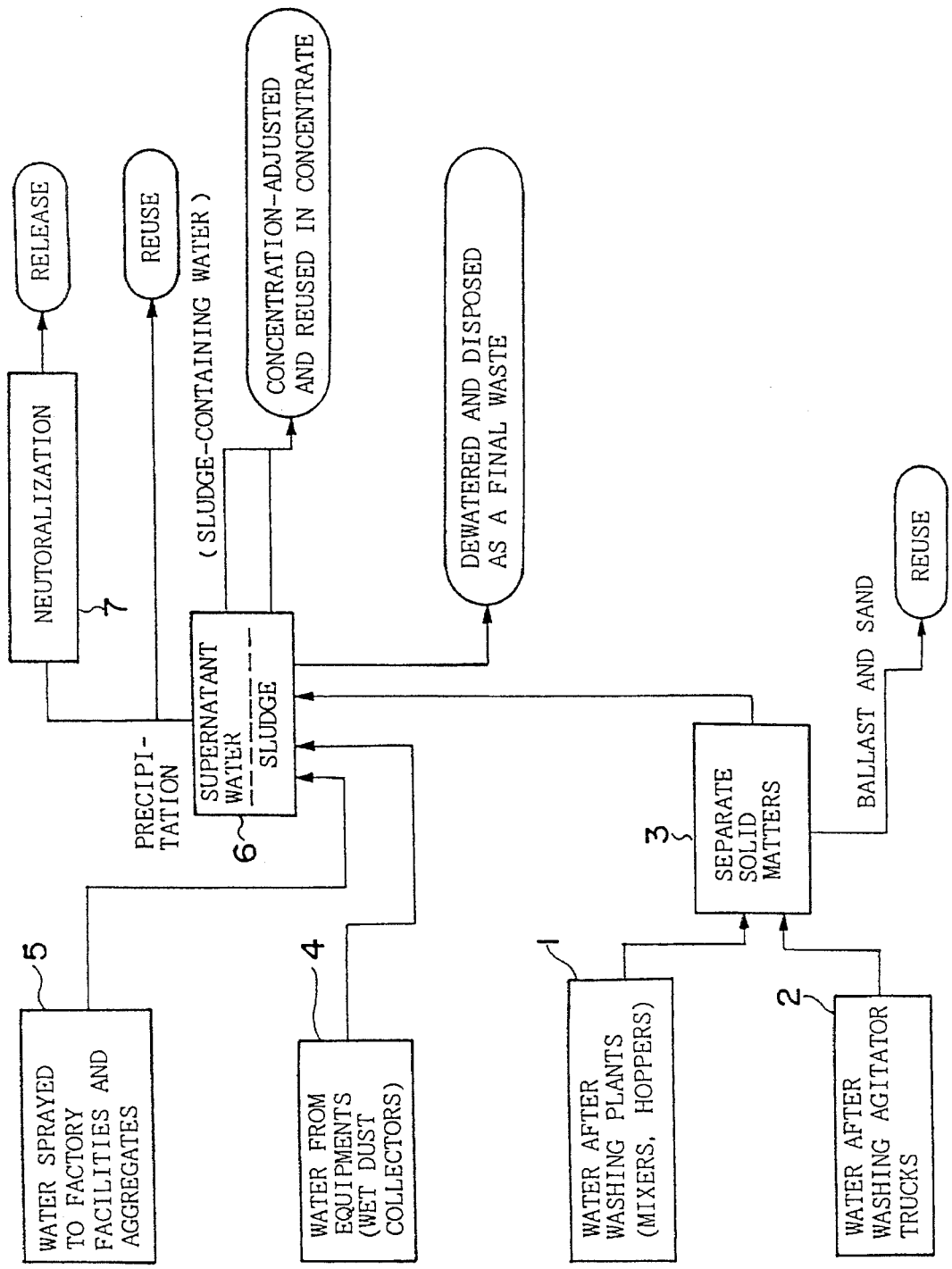
FIG. 3 is a flow chart of a process of a conventional exhaust water treatment system.

In FIG. 2, steps (1) to (8) are the same as those of FIG. 1. While the invention shown in FIG. 1 obtains the carbon dioxide absorber by finally treating the dewatered sludge in the drying/micronizing step 9, the second invention is different in that sludge separated from exhaust water by the step (6) is brought directly or through the dewatering step 8 into contact with exhaust gas from a cement factory, a thermal power plant or a iron mill to simultaneously attain both drying of the sludge and absorption of carbon dioxide by the sludge.

Sludge separated by the step (6) is sprayed into an exhaust air pipe provided upstream a Cottrell precipitator and exposed to hot exhaust gas containing carbon dioxide. As a result, the sludge is dried by the heat and absorbs carbon dioxide. Part of the sludge from the step (6) may be delivered to the dewatering step 8. Pancake-shaped sludge obtained by the dewatering step 8 is introduced in a rod mill together with exhaust gas, and it is crushed and dried there. The crushed and dried sludge is subsequently sent to the Cottrell precipitator and absorbs carbon dioxide therein.

The method according to the second invention does not require a separate step for drying sludge. Instead, it can simultaneously execute both drying of sludge discharged upon manufacturing fresh mixed concrete or concrete secondary products and absorption of carbon dioxide contained in exhaust gas from a cement factory, etc. by using a dust collector, or the like, equipped in cement factories, thermal power plants or iron mills.

The carbon dioxide absorber obtained by the method and having absorbed carbon dioxide may be reused as a cement material.

According to the invention, sludge discharged upon manufacturing fresh mixed concrete or concrete secondary products can be used as a carbon dioxide absorber by applying simple treatments thereto.

Moreover, since the carbon dioxide absorber according to the invention is made from inexpensive sludge, a large amount thereof can be produced, and by using the carbon dioxide absorber, global warming caused by an increase in carbon dioxide can be alleviated or prevented.

In addition, since the carbon dioxide absorber according to the invention is in the form of fine particles having a large surface area, it is efficient and excellent in carbon dioxide absorbing property.

Further, according to the invention, since it is possible not only to absorb carbon dioxide in a large amount of exhaust heat and gas discharged from cement factories, thermal power plants, iron mills, etc. and also to dry sludge resulting from manufacturing fresh mixed concrete, etc., power saving is attained.

What is claimed is:

1. A method for absorbing carbon dioxide contained in exhaust gas from a power plant or factory which contains carbon dioxide, comprising the steps of: separating sludge containing calcium hydroxide from exhaust water discharged upon manufacturing fresh mixed concrete or concrete secondary products; dewatering the separated sludge; putting the separated sludge or the dewatered sludge into contact with said exhaust gas.

2. The method of claim 1 including the step of drying the dewatered sludge prior to contact with the exhaust gas.

3. The method of claim 2 including the step of crushing the dried sludge prior to contact with the exhaust gas.

4. A method for reacting carbon dioxide in factory exhaust gas comprising the steps of: separating sludge from exhaust water discharged during manufacturing of fresh mixed concrete, the sludge containing solids including calcium hydroxide and water; and putting the sludge into contact with the exhaust gas, whereby the calcium hydroxide is converted to calcium carbonate upon absorption of the carbon dioxide.

5. The method of claim 4 including the step of precipitating the sludge containing exhaust water to separate solids from the water prior to putting the sludge into contact with the exhaust gas.

6. The method of claim 5 wherein precipitating includes separating the sludge into an uppermost layer of supernatant water, an intermediate layer of sludge-containing water, and a lowest layer of sludge.

7. The method of claim 6 further including the step of dewatering the sludge from the lowest layer to remove moisture.

8. A method for absorbing carbon dioxide contained in exhaust gas of a concrete manufacturing factory including the steps of:

separating sludge containing calcium hydroxide from exhaust water discharged upon manufacturing fresh mixed concrete; removing water from the separated sludge; and putting the dewatered sludge into contact with the exhaust gas whereby the calcium hydroxide absorbs the carbon dioxide.

* * * * *